C. B. BAZZONI.
PHOTOGRAPHIC CAMERA SHUTTER.
APPLICATION FILED MAY 7, 1915.
1,187,236.
Patented June 13, 1916.
2 SHEETS—SHEET 1.
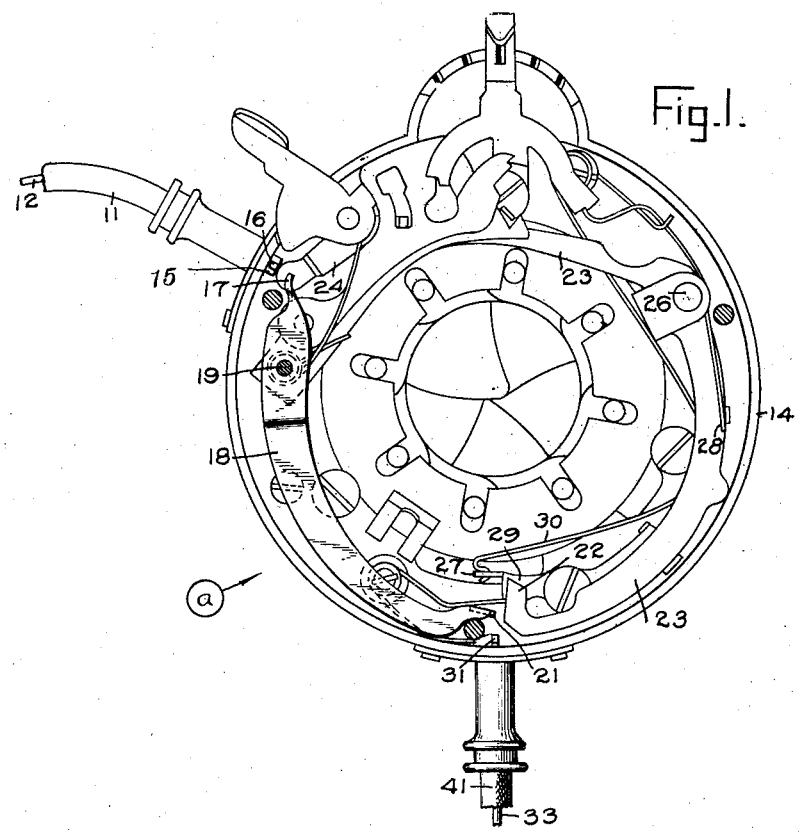
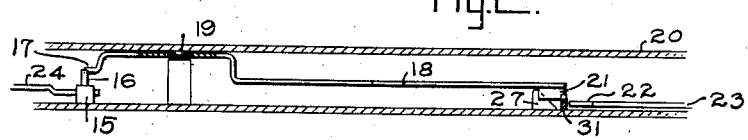
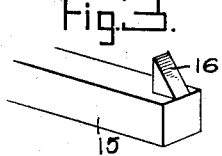
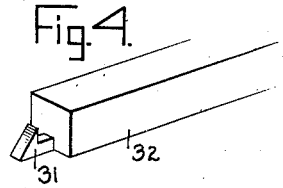
WITNESSES:
INVENTOR
C. B. Bazzoni.
BY
ATTORNEY

C. B. BAZZONI.
PHOTOGRAPHIC CAMERA SHUTTER.
APPLICATION FILED MAY 7, 1915.

1,187,236.

Patented June 13, 1916.
2 SHEETS—SHEET 2.

WITNESSES:

INVENTOR
C. B. Bazzoni
BY
ATTORNEY

UNITED STATES PATENT OFFICE.

CHARLES BLIZARD BAZZONI, OF PHILADELPHIA, PENNSYLVANIA.

PHOTOGRAPHIC-CAMERA SHUTTER.

1,187,236.       Specification of Letters Patent.     Patented June 13, 1916.

Application filed May 7, 1915. Serial No. 26,525.

*To all whom it may concern:*

Be it known that I, CHARLES B. BAZZONI, a citizen of the United States, and a resident of Philadelphia, in the county of Philadelphia and State of Pennsylvania, have invented a new and Improved Photographic-Camera Shutter, of which the following is a full, clear, and exact description.

Among the principal objects which the present invention has in view are: to provide means for avoiding the double exposure of sensitized medium; to provide a lock to prevent the double operation of a photographic shutter for exposing a sensitized medium; to provide a lock for the shutter mechanism of a camera and means for releasing the same, operable in correspondence with the manipulation of the sensitized material; to provide said means for releasing said lock with automatic attachments to be operated by conventional, physical characteristics of the usual sensitized mediums for cameras; to provide a mechanism of the character mentioned adapted for attachment to structures of usual make; and to provide a mechanism for the accomplishment of the above-stated purposes, which may be handled as an attachment to cameras of conventional construction.

Figure 5:
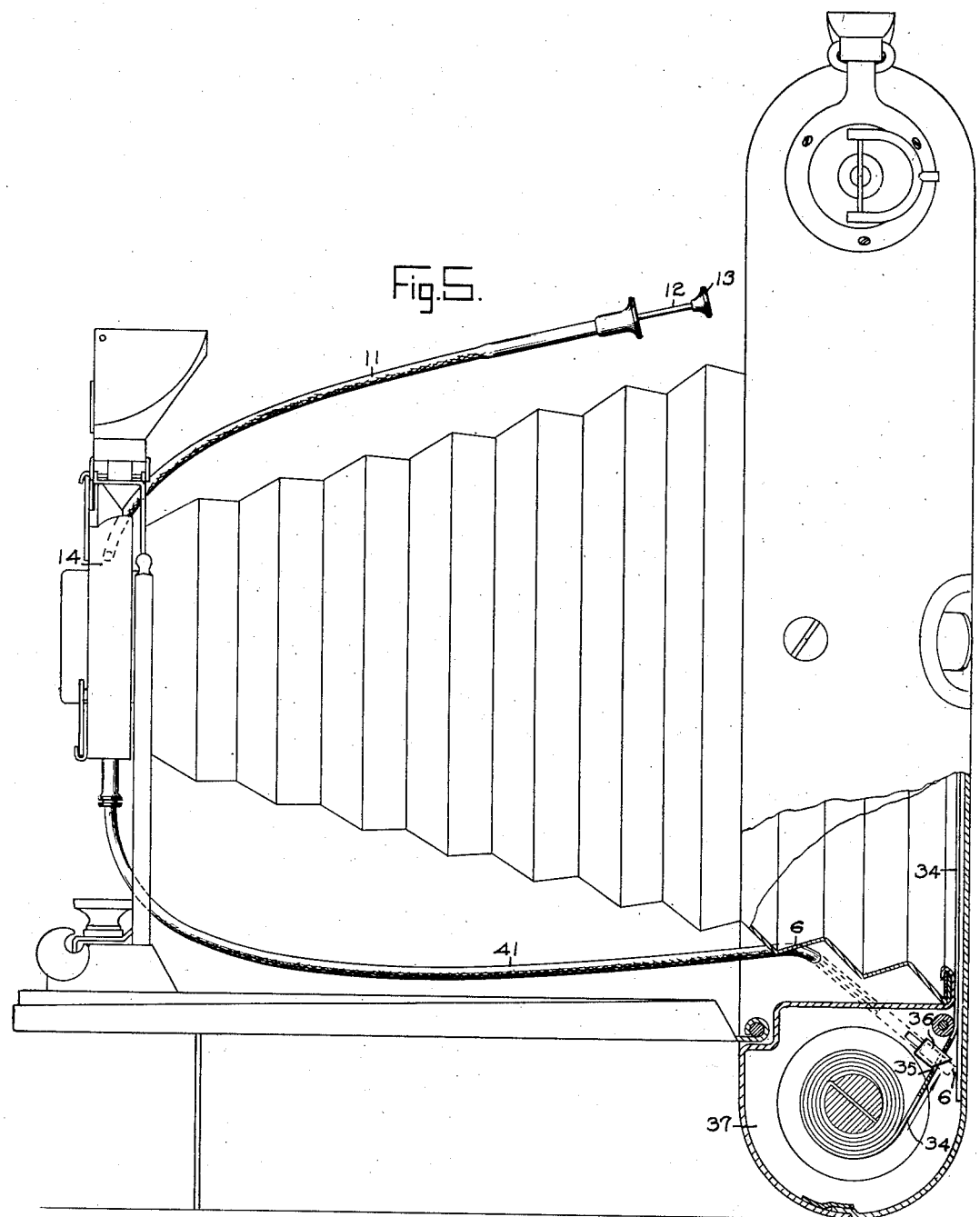
Figure 6:
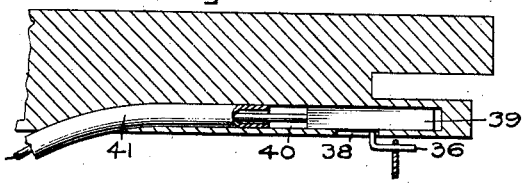

*Drawings.*—Figure 1 is a front view of a camera shutter constructed and arranged in accordance with the present invention, the face plate thereof being removed; Fig. 2 is an enlarged detail view showing an edge view of the locking lever with which the present shutter is provided, and in conjunction therewith means for setting and releasing the same, the view being taken as from the station indicated by the arrow *a* in Fig. 1; Fig. 3 is an enlarged detail view in perspective, showing the end of the manually operated shutter-releasing devices constructed in accordance with the present invention; Fig. 4 is an enlarged detail view in perspective showing the end of a releasing member for said lever; Fig. 5 is a side view of a camera of conventional form, partly in section and equipped with a shutter and operating mechanism therefor constructed and arranged in accordance with the present invention; Fig. 6 is an enlarged detail view in section, the section being taken as on the line 6—6 in Fig. 5.

*Description.*—As seen in the drawings, the mechanism the operation of which results in the opening and closing of the shutter, is of conventional construction. For the manual manipulation of said mechanism, the shutter is provided with a flexible cable 11, preferably of the Bowden type, having a thrust member 12 manually operable by a push-button 13, and terminating within the casing 14 for the shutter in a plunger 15. The plunger 15 is preferably square in cross section and is provided in accordance with the present invention, with a spur 16, the office of which is to engage the setting finger 17 with which a locking lever 18 is provided, and which normally extends in the path of the spur 16 to be moved from the inclined face thereof, when the same is operated to release the shutter. The thrust member 12 is provided with or affected by a spring for retracting the same to the initial or inactive position, wherein the button 13 is extended substantially as shown in Fig. 5 of the drawings.

The lever 18 is pivotally mounted by a rivet 19 on the face-plate 20 which is normally mounted on the casing 14 to protect the operative parts of the shutter therein contained. The end of the lever 18 which has the finger 17 is relatively short and proportioned to the longer end of said lever to move the foot 21 thereof to a position over the trip end 22 of a trip lever 23 forming part of the conventional shutter mechanism. Normally, and as best shown in Fig. 1 of the drawings, the foot 21 is withdrawn from the path of the trip end 22. It is only when the spur 16 engages the finger 17 to draw the same outward on the retraction of the member 12, that the foot 21 is moved to the position indicated as superposed on the trip end 22.

In the operation of the shutter mechanism, the plunger 15, moving inward, rocks a lever 24, the free end of said lever resting normally in contact with the end of the plunger 15, as seen best in Fig. 1 of the drawings. The opposite end of the lever 24 rests beneath the end of the bowed trip lever 23. The lever 23 is pivoted on a pin 26 at the far side of the casing 14. The arrangement provides that when the end in contact with the lever 24 is lifted thereby, the trip end 22 is moved forward to ride over the inclined surface of the trigger 27. Provision is made in the mechanism referred to as the shutter-operating-mechanism, for releasing the lever 23 at the end of the movement of the lever 24. When the lever 23 is thus released, the spring 28 is permitted to rock said lever back to its initial, normal position, carrying the trigger 27 therewith until said trigger passes to the inclined surface 29 of the trip end 22. The movement thus imparted to the trigger 27 is transmitted to the shutter mechanism to open the leaves thereof. When the trigger passes to the inclined surface 29 and escapes the control of the trip end 22, a spring 30 operates to return the trigger to its initial position, which motion is transmitted to the shutter-operating mechanism to close the leaves thereof.

When the operator releases the member 12 or the push-button 13 thereof, the spur 16, engaging the finger 17, moves the same backward until it passes over the end of the same, due to the divergence in the paths of travel of the spur 16 and finger 17. When said spur and finger disengage, the foot 21 will be found to have been disposed above the trip end 22, to operate thereon as an interference member to prevent the subsequent lift thereof over the trigger 27. Until the foot 21 is now removed from the path of the trip end 22, it is obvious that the shutter mechanism will not operate, the trigger 27 being undisturbed by the trip end 22 of the trip lever 23. In the present invention the foot 21 is released by a hook 31 at the end of a plunger 32.

The plunger 32 is operatively mounted on a thrust member 33 of the flexible cable 41. The hook 31 is wedge-shaped, having an inclined surface which forces under the foot 21 the lever 18, flexing to permit the lift of said foot. Immediately the head of the hook passes beyond the foot 21, the spring of the lever 18 seats the foot 21 behind the barb of the hook 31. When the plunger 32 is now drawn outward, it is obvious that the lever 18 is rocked on its pivot, placing the finger 17 again in the path of the spur 16, while the foot 21 swings out of the path of, to be disengaged from, the hook 31.

The action described with reference to the plunger 32 is imparted by the film 34 when the same is used as the sensitized element for the camera. The film 34 is provided adjacent one edge thereof with a series of apertures 35. The apertures 35 are spaced apart a distance equaling substantially the negative produced by the operation of the camera.

Resting in the path of these apertures is a shoe 36 adapted to ride on the film as the same travels across the exposure area of the camera. Preferably the shoe 36 is disposed, as shown in Fig. 5 of the drawings, in the chamber 37 wherein is placed the unexposed roll when loading the camera. The shoe 36 extends through a slot 38 formed in the side of the camera case, where it is secured to a plunger 39. To receive the plunger 39, the camera case is bored to form a runway 40 to house the end of a flexible cable 41 in which the thrust member 33 is incased.

*Operation.*—When using a shutter constructed and arranged as above described, the operation is as follows: The operator presses the button 13, to force inward the thrust member 12 and the plunger 15 at the end thereof, upon the lever 24. The lever 24, as described, moves the trip lever 23 to engage the trigger 27. Coincident with this movement the spur 16 on the plunger 15 passes under and to the inner side of the finger 17, engaging the same. After the shutter mechanism is set for instantaneous work, the exposure is completed and the shutter closed, when the plunger 15 moves to the end of its stroke. The operator now releases the button 13, permitting the same to retract, carrying therewith the plunger 15, the spur 16 and the finger 17 on the lever 18. Before the plunger 15 reaches the outward terminus of its movement, the foot 21 on the opposite end of the lever 18 has been moved over the trip end 22 of the trip lever 23, and the finger 17 has been released.

The operation above described had for its purpose to expose a section of the film 34. When the section to be exposed was moved into focal position, the shoe 36 moved into the aperture 35 next succeeding the area of the film to be exposed. It is obvious that if, through carelessness or ignorance of the fact that the sensitized element had been exposed, the operator undertook to make a second exposure, he would be prevented from doing so by the interposition of the foot 21 above the trip end 22. The interposition thus introduced in the operation of the shutter notifies the operator that the exposure has been made, and compels him to move the next area of the film to the exposure position in the camera. When the operator thus moves the film 34, the edge of the aperture 35, bearing against the inclined surface of the shoe 36, rides it up on the surface of the film. The plunger 39, thrust member 33, plunger 32 and hook 31 are simultaneously moved, said foot passing below, to engage the hook 21. When, the film 34 having been moved to present the next succeeding sensitized area, the shoe 36 registers with the next succeeding aperture 35, it is forced therein, retracting the member 33, plunger 32, hook 31 and foot 21 engaged thereby. Prior to the completion of this outward movement of the plunger 32 the hook 31 passes from engagement with the foot 21, having placed the finger 17 in the path of the spur 16 on the plunger 15. In this position the second or succeeding exposure may be made by pressing the button 13 in the manner as above described.

While I have herein described the locking of the shutter-operating mechanism as effected by the lever 18, it will be understood that other means may be employed for locking said mechanism, such means being capable of release by the plunger 32 and engagement member connected therewith when the shoe 36 passes through or into an aperture formed in the film 34.

Other means of connection than the flexible cables 11 and 41 may be used. Air tubes or ordinary shafting with appropriate attachments, or suitable electro-mechanical devices, may be employed, which mechanisms may be operated by the spool or turn-screw or moving parts.

Claims:

1. In combination, a photographic camera shutter mechanism having an interference member, the ends whereof are disposed in the path of the actuating lever and trip lever forming part of said mechanism; and means for removing said interference member from the path of said levers, said means embodying a sensitized member to be exposed to the light by the operation of said shutter mechanism, and said sensitized member having recesses for operatively affecting said means when said sensitized member is moved into operative relation to said mechanism.

2. In combination, a photographic camera shutter mechanism having an interference member, the ends whereof are disposed in the path of the actuating lever and trip lever forming part of said mechanism; mechanism for removing said interference member from the path of said levers, said mechanism embodying a hook member, a sensitized member movable to operate in conjunction with said shutter mechanism, said member having a recess; and a transmission mechanism operatively relating said hook and recess, whereby said hook is operated by said sensitized member when the recessed portion thereof is moved incident to the adjustment of said sensitized member.

3. In combination, a photographic camera shutter mechanism having a trigger lever and a trip lever, the former being manually operated to release the latter, and shutter mechanism normally restrained thereby; a rocking lever, the ends whereof are disposed in the path of, to engage said trigger lever and said trip lever alternately; a hook member adapted to engage said rocking lever and place the same in position to engage said trigger lever and to disengage said trip lever; means operatively connecting said hook member; and a sensitized member for operating said hook member, said member movable to be light exposed by the operation of said shutter mechanism.

In testimony whereof I have signed my name to this specification in the presence of two subscribing witnesses.

CHARLES BLIZARD BAZZONI.

Witnesses:
ERNEST BATES,
LEON A. THOMAS.